(12) United States Patent
Hironaka

(10) Patent No.: US 10,132,421 B2
(45) Date of Patent: Nov. 20, 2018

(54) SOLENOID AND SOLENOID VALVE

(71) Applicant: KYB Corporation, Tokyo (JP)

(72) Inventor: Tsuyoshi Hironaka, Kanagawa (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 15/508,649

(22) PCT Filed: Aug. 24, 2015

(86) PCT No.: PCT/JP2015/073710
§ 371 (c)(1),
(2) Date: Mar. 3, 2017

(87) PCT Pub. No.: WO2016/035594
PCT Pub. Date: Mar. 10, 2016

(65) Prior Publication Data
US 2017/0284557 A1    Oct. 5, 2017

(30) Foreign Application Priority Data

Sep. 4, 2014 (JP) .................................. 2014-180514

(51) Int. Cl.
*F16K 31/06* (2006.01)
*F16K 3/24* (2006.01)
(Continued)

(52) U.S. Cl.
CPC ............ *F16K 31/0675* (2013.01); *F16K 3/24* (2013.01); *F16K 27/048* (2013.01); *F16K 31/0668* (2013.01); *H01F 7/128* (2013.01); *H01F 7/16* (2013.01); *H01F 7/1607* (2013.01); *Y10T 137/794* (2015.04)

(58) Field of Classification Search
CPC .... F16K 31/0675; F16K 3/24; F16K 31/0668; H01F 7/1607
See application file for complete search history.

(56) References Cited

U.S. PATENT DOCUMENTS 6,640,834 B1   11/2003   Hamkins et al.
7,591,281 B2 *  9/2009   Tsuge .................. F16K 31/0655
                                                         137/495
(Continued)

FOREIGN PATENT DOCUMENTS

JP      H08-288132 A      11/1996
JP      2004-036878 A      2/2004
(Continued)

*Primary Examiner* — Craig Schneider
*Assistant Examiner* — Kevin Barss
(74) *Attorney, Agent, or Firm* — Rabin & Berdo, P.C.

(57) ABSTRACT

A solenoid includes a coil configured to generate magnetic force when a current flows therethrough; a stator core provided inside the coil, the stator core being configured to be excited by the magnetic force of the coil; a plunger received in a plunger chamber formed inside the stator core, the plunger being configured to move toward an attraction part in the plunger chamber by the magnetic force of the coil; a shaft provided to be able to move, together with the plunger, along axial direction; and a filter provided inside the stator core. The filter is provided on a side of the attraction part from the plunger and in an axial range where the coil is provided.

9 Claims, 3 Drawing Sheets

(51) Int. Cl.
   *H01F 7/128*   (2006.01)
   *H01F 7/16*    (2006.01)
   *F16K 27/04*   (2006.01)

(56) References Cited

U.S. PATENT DOCUMENTS

| | | |
|---|---|---|
| 2003/0159453 A1 | 8/2003 | Ott et al. |
| 2003/0159454 A1 | 8/2003 | Ott et al. |
| 2003/0160672 A1 | 8/2003 | Ott et al. |
| 2003/0160673 A1 | 8/2003 | Ott |
| 2005/0161098 A1 | 7/2005 | Ott et al. |
| 2005/0161626 A1 | 7/2005 | Ott |
| 2005/0211316 A1 | 9/2005 | Ott et al. |
| 2011/0297603 A1* | 12/2011 | Hall ........... B01D 35/06 210/222 |
| 2013/0134339 A1* | 5/2013 | Miura ........... F16K 31/0655 251/129.15 |

FOREIGN PATENT DOCUMENTS

| | | |
|---|---|---|
| JP | H11-031617 A | 3/2004 |
| JP | 2004-132355 A | 4/2004 |
| JP | 2005-155794 A | 6/2005 |
| JP | 2010-135469 A | 6/2010 |

\* cited by examiner

SOLENOID AND SOLENOID VALVE

TECHNICAL FIELD

The present invention relates to a solenoid and a solenoid valve.

BACKGROUND ART

JP2005-155794A discloses a solenoid valve including a coil that generates magnetic force by energization, a plunger that is provided to be able to move in the axial direction, a stator that guides the magnetic force, generated by the coil, to the opposite position of the plunger in the axial direction, a bearing that supports a shaft in a displaceable manner in the axial direction, a plunger receiving chamber that receives the plunger in a displaceable manner in the axial direction, a breathing hole that is formed in a housing receiving a driven body and that causes the inside and outside of the housing to communicate with each other, and a breathing passage that causes the breathing hole and the plunger receiving chamber to communicate with each other. According to this solenoid valve, a filter is provided in the breathing passage.

SUMMARY OF INVENTION

With the solenoid in general, malfunction may be caused when a plunger that moves inside a plunger receiving chamber bites contamination that is formed mainly by metal powder and that enters the plunger receiving chamber. Therefore, according to the solenoid valve as disclosed in JP2005-155794A, a filter is provided in the breathing passage that causes the plunger receiving chamber and the inside of the housing to communicate with each other, so as to prevent the contamination from entering the plunger receiving chamber.

With the solenoid valve as disclosed in JP2005-155794A, however, working fluid does not actively flow from the inside of the housing toward the plunger receiving chamber. Namely, the filter does not actively remove the contamination in the working fluid, and thus the solenoid valve as disclosed in JP2005-155794A does not remove the contamination sufficiently, and the malfunction of the solenoid may be caused.

It is an object of the present invention to reduce the malfunction of the solenoid.

According to one aspect of the present invention, a solenoid includes a coil configured to generate magnetic force when a current flows therethrough; a stator core provided inside the coil, the stator core being configured to be excited by the magnetic force of the coil; a plunger received in a plunger chamber formed inside the stator core, the plunger being configured to move toward an attraction part in the plunger chamber by the magnetic force of the coil; a shaft provided to be able to move, together with the plunger, along axial direction; and a filter provided inside the stator core. The filter is provided on a side of the attraction part from the plunger and in an axial range where the coil is provided.

DESCRIPTION OF EMBODIMENTS

Hereinafter, an embodiment of the present invention will be explained with reference to the drawings.

A solenoid is an electromagnetic actuator that generates magnetic force by energizing a coil, and drives a plunger by the magnetic force. In the following embodiment, an explanation will be given to a solenoid 100 that is used in a solenoid valve 1 for controlling a flow rate of working fluid.

First, the entire structure of the solenoid valve 1 having the solenoid 100 according to the embodiment of the present invention will be explained with reference to FIG. 1.

The solenoid valve 1 controls the flow rate of hydraulic oil, as the working fluid, that is guided from a fluid pressure source (not illustrated) to a fluid pressure apparatus (not illustrated) or the like. The working fluid is not limited to the hydraulic oil, and may be other non-compressive fluid or compressive fluid.

Figure 1:
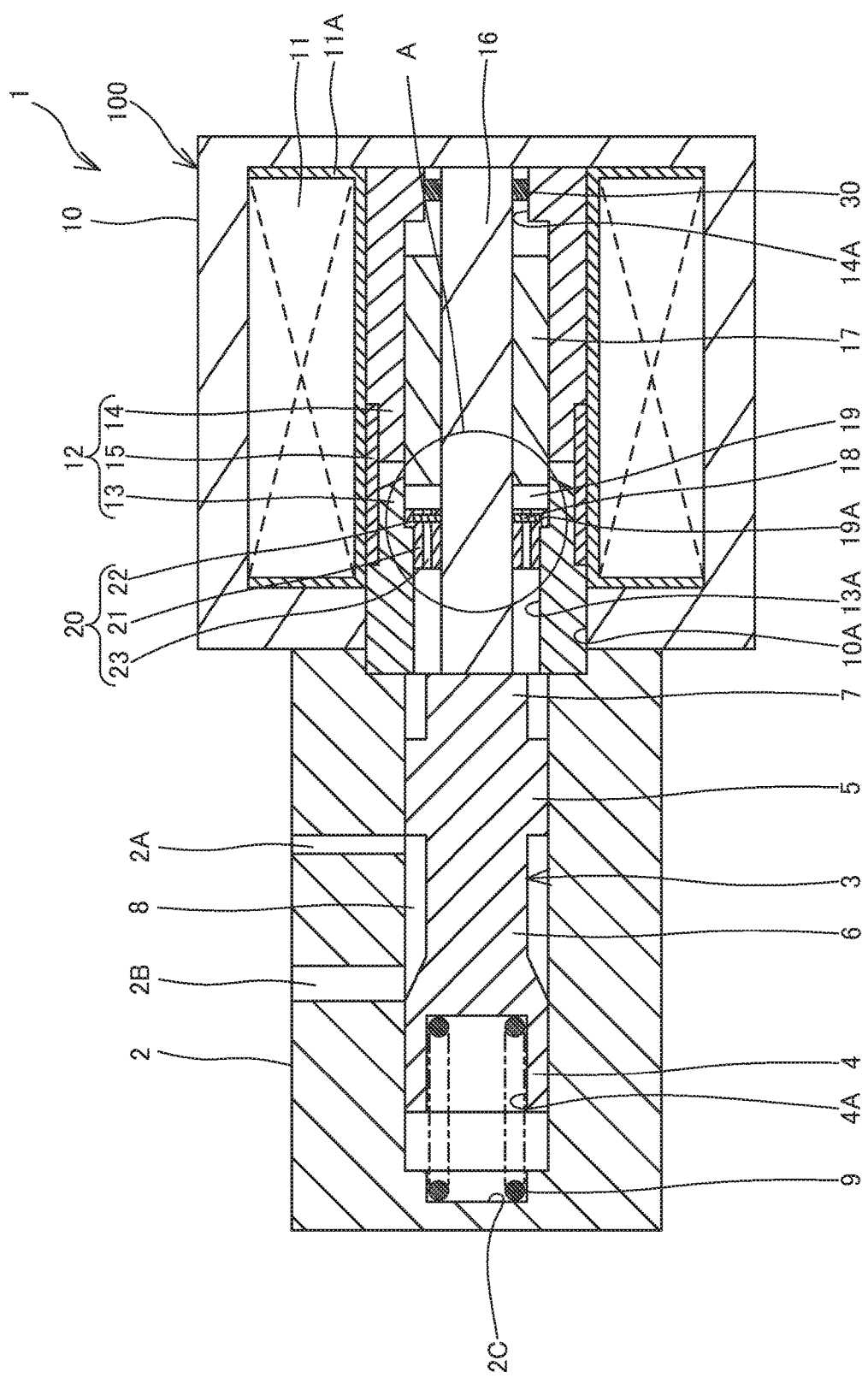
FIG. 1 is a cross-sectional view of a solenoid valve that is provided with a solenoid according to an embodiment of the present invention.

As illustrated in FIG. 1, the solenoid valve 1 is provided with a housing 2 that has a bottomed cylindrical shape, a spool 3 that is provided inside the housing 2 to be able to move freely and that serves as a valve body, and a coil spring 9 that is provided inside the housing 2 and that serves as a biasing member for biasing the spool 3.

In the housing 2, an inflow path 2A and an outflow path 2B, as valve paths through which the hydraulic oil flows, are formed next to each other along the axial direction. The inflow path 2A communicates with the inside of the housing 2, and communicates with the fluid pressure source via a not-illustrated pipe or the like. The outflow path 2B communicates with the inside of the housing 2, and communicates with a hydraulic machine or the like via a not-illustrated pipe or the like.

The spool 3 has a first land part 4 and a second land part 5 that slide along the inner peripheral surface of a housing 2, a small-diameter part 6 that is formed to have a smaller outer diameter than those of the first land part 4 and the second land part 5 and that couples the first land part 4 and the second land part 5, and a tip end part 7 that comes in contact with a later-described shaft 16 of the solenoid 100.

A spring housing recessed part 4A that houses a part of the coil spring 9 is formed at the end of the first land part 4. The second land part 5 slides along the inner peripheral surface of the housing 2, and adjusts an opening degree of the inflow path 2A.

The small-diameter part 6, formed to have the smaller diameter than the outer diameters of the first land part 4 and the second land part 5, forms an annular fluid chamber 8 between itself and the inner peripheral surface of the housing 2. The fluid chamber 8 communicates with the inflow path 2A and the outflow path 2B, and guides the hydraulic oil, after passing through the inflow path 2A, to the outflow path 2B.

The coil spring 9, in a compressed state, is interposed between the spring housing recessed part 4A of the first land part 4 of the spool 3 and a bottom part 2C of the housing 2, so as to bias the spool 3 against the movement of the plunger 17 of the solenoid 100. Namely, the coil spring 9 biases the spool 3 in the direction with which the second land part 5 opens the inflow path 2A (right direction in FIG. 1).

The solenoid 100 is provided in such a solenoid valve 1, and drives the spool 3 in the axial direction.

The solenoid 100 has a cylindrical yoke 10 that is formed by a magnetic material, a coil 11 that is provided inside the yoke 10 and that generates magnetic force when a current flows therethrough, a stator core 12 that is provided inside the coil 11 and that is configured to be excited by the magnetic force of the coil 11, the shaft 16 that penetrates through the stator core 12 and that is provided to be able to move along the axial direction, and a plunger 17 that is fixed to the outer periphery of the shaft 16.

The yoke 10 is formed to have a bottomed cylindrical shape, and is abutted against and fixed to the end surface of the housing 2 on the opening side.

The coil 11 is molded by a resin material 11A, and is provided inside the yoke 10. The coil 11 generates the magnetic force when a current, supplied via a terminal (not illustrated), flows therethrough.

The stator core 12 is a cylindrical member that is provided inside the coil 11. The stator core 12 is formed by a first stator core 13 that is provided inside an opening part 10A of the yoke 10, a second stator core 14 that is arranged in series with the first stator core 13 with a space therebetween, and a coupling member 15 that couples the outer peripheries of the first stator core 13 and the second stator core 14. The first stator core 13 and the second stator core 14 are formed by a magnetic material, and the coupling member 15 is formed by a nonmagnetic material.

Inserting holes 13A and 14A, through which the shaft 16 is inserted, are provided in the first stator core 13 and the second stator core 14, respectively. Inside the first stator core 13 and the second stator core 14, a plunger chamber 19 for receiving the plunger 17 is formed. The plunger chamber 19 is formed to have the larger diameter than those of the inserting holes 13A and 14A. A step surface between the plunger chamber 19 and the inserting hole 13A of the first stator core 13 forms an attraction surface 19A, as an attraction part, at which the plunger 17 is attracted to the stator core 12 by the magnetic force of the coil 11. In other words, the end surface at the end of the plunger chamber 19 on the first stator core 13 side forms the attraction surface 19A.

The shaft 16 is supported to be able to slide along the axial direction, by a first bearing 20 that serves as a shaft bearing and that is provided in the inserting hole 13A of the first stator core 13, and a second bearing 30 that is provided in the inserting hole 14A of the second stator core 14. The shaft 16 is inserted through the first stator core 13 and the second stator core 14. The tip end of the shaft 16 comes in contact with the tip end part 7 of the spool 3. Thereby, the spool 3 moves together with the movement of the shaft 16.

The plunger 17 is formed by a magnetic material. The plunger 17 is received in the plunger chamber 19 that is formed inside the first stator core 13 and the second stator core 14. The plunger 17 is fixed to the shaft 16 by caulking or the like, in order to avoid misalignment with respect to the shaft 16. By the magnetic force of the coil 11, attraction force approaching the attraction surface 19A, as one end part of the plunger chamber 19, acts on the plunger 17, and the plunger 17 moves in the plunger chamber 19.

Next, the operation of the solenoid valve 1 will be explained.

Under the unenergized state, where a current does not flow through the coil 11, the attraction force does not act on the plunger 17, and hence the spool 3 is biased in the direction opening the inflow path 2A (right direction in FIG. 1), by the biasing force of the coil spring 9. Therefore, as illustrated in FIG. 1, the inflow path 2A and the outflow path 2B are caused to communicate via the fluid chamber 8, and the pass of the hydraulic oil is permitted.

When a current flows through the coil 11 and the magnetic force is generated, the plunger 17 is excited, and the attraction force, in the direction approaching the attraction surface 19A of the first stator core 13 (left direction in FIG. 1), acts on the plunger 17. The attraction force like this causes the plunger 17 to move toward the attraction surface 19A.

The force in the direction compressing the coil spring 9 acts on the spool 3, by the attraction force applied via the shaft 16. For this reason, the spool 3 moves to the position where the attraction force and the biasing force by the coil spring 9 are in balance. As the amount of the current flowing through the coil 11 increases, the attraction force between the plunger 17 and the first stator core 13 increases. Therefore, as a current value flowing through the coil 11 increases, the spool 3 moves in the direction compressing the coil spring 9, against the biasing force of the coil spring 9.

When the current value flowing through the coil 11 is increased and the spool 3 is moved against the biasing force of the coil spring 9, the inflow path 2A is gradually closed by the second land part 5. This causes a reduction in an opening area of the inflow path 2A relative to the fluid chamber 8. Thus, the flow rate of the hydraulic oil, guided to the fluid chamber 8 via the inflow path 2A, is reduced.

When the current value flowing through the coil 11 is increased further and a stroke amount of the plunger 17 toward the first stator core 13 is increased, the inflow path 2A is fully closed by the second land part 5. Thus, the communication between the inflow path 2A and the outflow path 2B is blocked.

As described thus far, the solenoid valve 1 adjusts the flow rate of the hydraulic oil guided from the inflow path 2A to the outflow path 2B, by controlling the current value flowing through the coil 11 and moving the spool 3 in the axial direction.

Next, the structure of the first bearing 20 and a filter 18 that is provided in the first bearing 20 will be explained in detail.

The solenoid 100 further includes the filter 18 that is provided inside the first stator core 13 of the stator core 12.

The filter 18 permits the pass of the hydraulic oil and limits the pass of contamination such as metal powder. The filter 18 is formed by a magnetic material, and is provided in the first bearing 20, as the shaft bearing, that is provided in the inserting hole 13A of the first stator core 13.

The first bearing 20 is formed by a nonmagnetic material. Specifically, it is formed by a nonmagnetic resin material.

Figure 2:
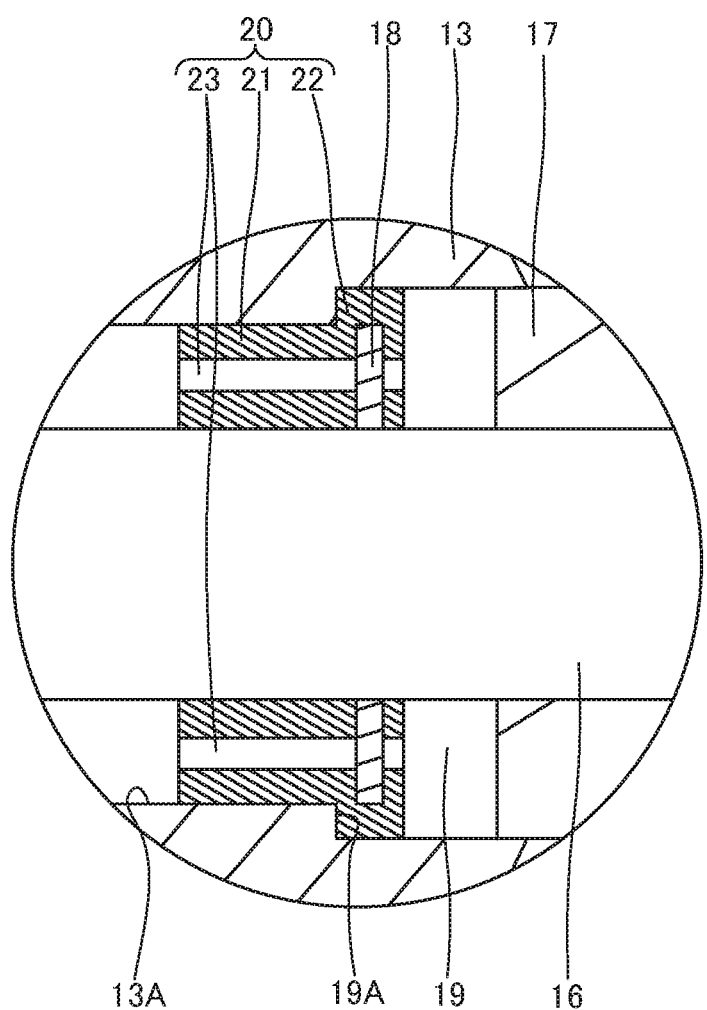
FIG. 2 is an enlarged view of an A part in FIG. 1.

As illustrated in FIG. 2, the first bearing 20 includes a cylindrical part 21 that has a cylindrical shape, and a flange part 22 that is formed to protrude in an annular shape toward the outer side in the radial direction from one end of the cylindrical part 21.

The cylindrical part 21 is forcibly fitted to the inserting hole 13A of the first stator core 13. Thereby, the first bearing 20 is fixed to the first stator core 13.

The flange part 22 is received inside the plunger chamber 19 with one end surface thereof being abutted against the attraction surface 19A. Namely, the flange part 22 is provided between the attraction surface 19A of the first stator core 13 and the plunger 17. Thus-provided flange part 22 avoids the abutment between the attraction surface 19A of the first stator core 13 and the plunger 17.

Two suction passages 23 that penetrate through the cylindrical part 21 and the flange part 22 along the axial direction are formed in the first bearing 20. The inserting hole 13A of the first stator core 13 communicates with the plunger chamber 19 via the suction passages 23. The number of the suction passages 23 is not limited to two, and may be freely set.

The filter 18 is formed to have an annular shape, and is provided in the flange part 22 of the first bearing 20, so as to cover the suction passages 23. The filter 18 is formed integrally with the first bearing 20 by insert molding. More specifically, as illustrated in FIG. 1, the first bearing 20 and the filter 18 are formed integrally in such a manner that the filter 18 is located in the axial range where the coil 11 is provided, with the first bearing 20 being fixed to the first stator core 13. Incidentally, the filter 18 may be provided in the cylindrical part 21 of the first bearing 20. Further, the filter 18 may have any shape as long as it is provided to cover the suction passages 23.

Thus, the filter 18 is located on the side of the attraction surface 19A (left side in FIG. 1) from the plunger 17, and in the axial range where the coil 11 is provided.

By thus-forming the first bearing 20, the magnetic force of the coil 11 acts on the axial range where the coil 11 is provided, when the coil 11 is energized. For this reason, the contamination formed by the metal powder, on the side of the attraction surface 19A from the plunger 17, and in the axial range where the coil 11 is provided, is attracted by the magnetic force toward the plunger chamber 19.

The contamination, attracted toward the plunger chamber 19, is adhered to the filter 18 via the suction passages 23 of the first bearing 20. Thus, the magnetic force of the coil 11 can actively remove the contamination by adhering it to the filter 18.

In addition, as the filter 18 is formed by the magnetic material, the filter 18 itself is excited when the coil 11 is energized. Therefore, the contamination adhered to the filter 18 can be left on the filter 18, without letting it flow in the hydraulic oil again.

The filter 18 may be preferably provided at the position closer to the attraction surface 19A. As the position of the filter 18 becomes closer to the attraction surface 19A, the contamination can be adhered to and left on the filter 18 by attracting the contamination with the greater magnetic force. When the filter 18 is provided at the position closer to the attraction surface 19A to which the plunger 17 is attracted by the magnetic force, the greater magnetic force acts on the contamination, and hence it is possible to increase the attraction force to the filter 18 that is applied to the contamination.

Further, the suction passages 23 of the first bearing 20 are formed along the axial direction. As the first bearing 20 is provided inside the coil 11, magnetic lines that pass through the first bearing 20 are almost parallel to the axis of the first bearing 20. As the suction passages 23 and the magnetic lines are almost parallel to each other like this, the attraction of the contamination can be made efficiently by the magnetic force.

Figure 3:
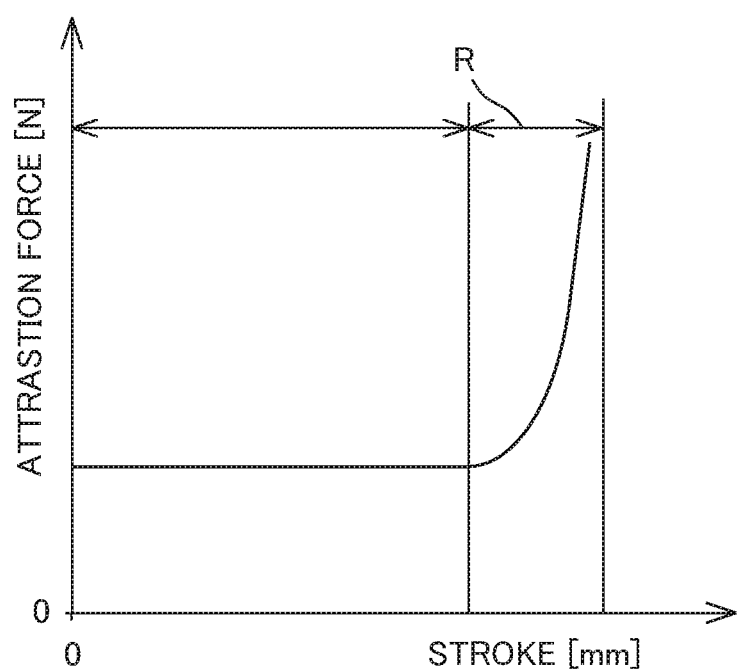
FIG. 3 is a graph illustrating the relationship between attraction force applied to a plunger and a stroke of the plunger.

Now, when the coil is energized and the plunger makes a stroke to the first stator core to the position immediately before abutment, the attraction force between the plunger and the first stator core may increase rapidly, as illustrated in FIG. 3. In such an area R, the attraction force increases rapidly when the current value flowing through the coil is increased and the stroke of the plunger slightly increases, and therefore it is difficult to control the current value flowing through the coil. Therefore, a spacer formed by a nonmagnetic material is generally provided between the attraction surface and the plunger, in order to prevent the plunger from approaching the first stator core to the area R where the attraction force increases rapidly.

Meanwhile, with the solenoid 100, the flange part 22 of the first bearing 20, formed by the nonmagnetic material, is provided between the plunger 17 and the first stator core 13. Thus, the flange part 22 prevents the plunger 17 from abutting against the attraction surface 19A of the first stator core 13, and from approaching the area R where the attraction force rapidly increases. In other words, the flange part 22 of the first bearing 20 is formed to have such thickness that the plunger 17 abuts against the flange part 22 of the first bearing 20 before the attraction force rapidly increases.

Thus, as the solenoid 100 is provided with the first bearing 20 having the flange part 22, it is possible to prevent the plunger 17 from approaching the first stator core 13 to the position immediately before abutment, and to prevent the control of the current value, flowing through the coil 11, from being difficult. Namely, the first bearing 20 functions as the bearing that supports the shaft 16, and at the same time functions as the spacer that prevents the abutment between the first stator core 13 and the plunger 17. Therefore, it is not necessary to provide a separate spacer in the solenoid 100, and a number of parts can be reduced.

The following effects can be obtained by the above-described embodiment.

With the solenoid 100, the energization of the coil 11 causes the contamination formed by the metal powder, on the side of the attraction surface 19A from the plunger 17, and in the axial range where the coil 11 is provided, to be attracted by the magnetic force toward the plunger chamber 19. As the filter 18 is provided on the side of the attraction surface 19A from the plunger 17, and in the axial range where the coil 11 is provided, the contamination, attracted by the magnetic force, is adhered to the filter 18. Thus, as the magnetic force of the coil 11 can actively remove the contamination by adhering it to the filter 18, it is possible to prevent the contamination from entering the plunger chamber 19, and to reduce the malfunction of the solenoid 100.

As the flange part 22 of the first bearing 20 is provided between the attraction surface 19A of the first stator core 13 and the plunger 17, it is possible to prevent the plunger 17 from approaching the attraction surface 19A of the first stator core 13 to the area where the attraction force rapidly increases. As the first bearing 20 also functions as the spacer for preventing abutment between the first stator core 13 and the plunger 17, it is not necessary to provide the separate spacer, and the number of parts can be reduced.

The filter 18 is formed integrally, by the insert molding, with the first bearing 20 that is formed by the nonmagnetic resin material. Thereby, the first bearing 20 having the filter 18 can be formed at a low cost.

As the filter 18 is formed by the magnetic material, the filter 18 is excited by the magnetic force of the coil 11, and thus the contamination can be adhered to and left on the filter 18 with more reliability.

As the suction passages 23 are formed along the axis of the first bearing 20 and are almost parallel to the magnetic lines of the coil 11, the attraction of the contamination can be made efficiently by the magnetic force.

According to the above-described embodiment, the solenoid 100 is used in the solenoid valve 1 that controls the flow rate of the hydraulic oil. However, it is not restrictive and the solenoid 100 may be used for other purposes.

According to the above-described embodiment, the filter 18 is formed integrally with the first bearing 20. Instead, a separate filter 18 may be provided in the first bearing 20. Further, the filter 18 may not be provided in the first bearing 20, and may be formed in a case by providing the case that is different from the first bearing 20, for example. Thus, it would be sufficient if the filter 18 is provided on the side of the attraction surface 19A from the plunger 17, and in the axial range where the coil 11 is provided.

According to the above-described embodiment, the filter 18 is formed by the magnetic material. The filter 18 is preferably formed by the magnetic material in order to cause the contamination to be adhered to and left on the filter 18, but the filter 18 formed by a nonmagnetic material may be provided.

Embodiments of this invention were described above, but the above embodiments are merely examples of applications of this invention, and the technical scope of this invention is not limited to the specific constitutions of the above embodiments.

This application claims priority based on Japanese Patent Application No. 2014-180514 filed with the Japan Patent Office on Sep. 4, 2014, the entire contents of which are incorporated into this specification.

The invention claimed is:

1. A solenoid comprising:
   a coil configured to generate magnetic force when a current flows therethrough;
   a stator core provided inside the coil, the stator core being configured to be excited by the magnetic force of the coil, and having a plunger chamber therein;
   a plunger received in the plunger chamber, the plunger being configured to move toward an attraction part in the plunger chamber by the magnetic force of the coil;
   a shaft that is movable together with the plunger, along an axial direction; and
   a filter provided inside the stator core, between the attraction part and the plunger.

2. The solenoid according to claim 1, wherein the filter is formed of a magnetic material.

3. A solenoid valve comprising:
   the solenoid according to claim 1;
   a housing;
   a valve body movably provided in the housing; and
   a biasing member provided in the housing, the biasing member being configured to bias the valve body against movement of the plunger of the solenoid.

4. The solenoid according to claim 1, wherein the filter is disposed closer to the attraction part than to the plunger.

5. The solenoid according to claim 1, wherein the solenoid is used for a solenoid valve that controls working fluid, and the filter is configured to remove contaminations in the working fluid flowing toward the plunger chamber.

6. The solenoid according to claim 1, wherein the filter is provided in an axial range the coil is provided.

7. A solenoid comprising
   a coil configured to generate magnetic force when a current flows therethrough;
   a stator core provided inside the coil, the stator core being configured to be excited by the magnetic force of the coil and having a plunger chamber therein;
   a plunger provided in the plunger chamber, the plunger being configured to move toward the attraction part in the plunger chamber by the magnetic force of the coil;
   a shaft that is movable together with the plunger, along an axial direction;
   a shaft bearing provided inside the stator core, the shaft bearing supporting the shaft slidably along the axial direction, the shaft bearing having a suction passage formed to penetrate therethrough along the axial direction; and
   a filter provided in the suction passage inside the stator core between the attraction part and the plunger along the axial direction.

8. The solenoid according to claim 7,
   wherein the stator core has an inserting hole with the shaft inserting therethrough,
   wherein the plunger chamber is formed to have a diameter larger than that of the inserting hole,
   wherein the attraction part is formed by a step surface formed between the plunger chamber and the inserting hole,
   wherein the shaft bearing, formed of a nonmagnetic material, and has a cylindrical part having a cylindrical shape, and a flange part formed to protrude in an annular shape in radial direction from one end of the cylindrical part,
   wherein the cylindrical part is provided in the inserting hole, and
   wherein the flange part is provided in the plunger chamber to be abutted against the attraction part.

9. The solenoid according to claim 8, wherein the filter is integrally formed with the shaft bearing.

\* \* \* \* \*